US006969962B2

(12) United States Patent
Oe

(10) Patent No.: US 6,969,962 B2
(45) Date of Patent: Nov. 29, 2005

(54) DC MOTOR DRIVE CIRCUIT

(75) Inventor: Kenji Oe, Kyoto (JP)

(73) Assignee: Nidec Corporation, Kyoto (JP)

( * ) Notice: Subject to any disclaimer, the term of this patent is extended or adjusted under 35 U.S.C. 154(b) by 32 days.

(21) Appl. No.: 10/707,220

(22) Filed: Nov. 27, 2003

(65) Prior Publication Data

US 2004/0104696 A1 Jun. 3, 2004

(30) Foreign Application Priority Data

Nov. 29, 2002 (JP) ............................ 2002-347887

(51) Int. Cl.[7] ........................... H02K 23/00; H02P 5/06
(52) U.S. Cl. ...................... 318/254; 318/138; 318/439; 318/700; 318/720; 318/721; 318/722; 318/432
(58) Field of Search ............................... 318/138, 254, 318/439, 700, 720–722, 430–434

(56) References Cited

U.S. PATENT DOCUMENTS 4,600,864 A * 7/1986 Sato ........................... 318/254
4,707,645 A * 11/1987 Miyao et al. ............... 318/254
4,728,833 A * 3/1988 Shiraki et al. ............ 310/68 R
4,737,674 A * 4/1988 Miyao ........................ 310/268
4,818,908 A * 4/1989 Tamae et al. ............... 310/171
5,005,751 A * 4/1991 Radtke et al. .............. 227/111
5,838,123 A * 11/1998 Zhao .......................... 318/254
6,020,700 A * 2/2000 Tien ........................... 318/254
6,140,782 A * 10/2000 Chin .......................... 318/254
6,274,992 B1 * 8/2001 Wang et al. ................ 318/362
6,570,351 B2 * 5/2003 Miyazaki et al. ........... 318/254
6,710,572 B2 * 3/2004 Okubo ....................... 318/727

FOREIGN PATENT DOCUMENTS

JP 9-47073 A 2/1997

* cited by examiner

*Primary Examiner*—Marlon T. Fletcher
*Assistant Examiner*—Tyrone Smith
(74) *Attorney, Agent, or Firm*—Judge Patent Firm

(57) ABSTRACT

A DC motor drive circuit includes a position detector for producing an output signal that corresponds to a rotational position of the rotor, a current controller for controlling current supply to the winding in accordance with the output signal of the position detector, and a phase advancing portion for the current between the position detecting portion and the current controller, so that the timing for supplying current to the winding is advanced and efficiency of converting the current supplied to the winding into a motor torque is improved.

8 Claims, 11 Drawing Sheets

H1:Voltage of the output terminal (10) of the Hall element(11)

H2:Voltage of the output terminal(9) of the Hall element(11)

H3:The period of the changeover of the Hall element(11)

D1:Output voltage from the differential amplifer(17)

D2:Advance in phase by the phase advance circuit

D3:Referential Voltage

A PRIOR ART

H1:Voltage of the output terminal (10) of the Hall element(11)

H2:Voltage of the output terminal(9) of the Hall element(11)

H3:The period of the changeover of the Hall element(11)

D1:Output voltage from the differential amplifer(17)

D3:Referential Voltage

DC MOTOR DRIVE CIRCUIT

BACKGROUND OF INVENTION

1. Field of the Invention

The present invention relates to a circuit for controlling drive current that flows in a stator winding in accordance with a signal from a position detecting element that detects a rotational position of a rotor in a DC brushless motor such as a fan motor.

2. Description of the Prior Art

In a conventional technique concerning a two-phase DC brushless motor such as a fan motor, as disclosed in Japanese unexamined patent publication No. 9-047073 for example, a position detecting element such as a Hall element is provided for detecting a rotational position of a rotor, so that current flowing in a stator winding is controlled in accordance with the output signal of the element.

FIG. 5 shows a conventional two-phase half-wave (unipolar) brushless DC motor drive circuit that is applied to such a DC fan motor. This circuit includes a drive IC 12 (for example, a motor drive IC, BA6811F made by ROHM CO., LTD.) for driving two-phase stator windings 14 and 15, a Hall element 11 as a position detecting element, a diode 13 and a capacitor 16. The drive IC 12 includes an operational amplifier 17, a control circuit 18 and transistors 19 and 20 for phases. The control circuit 18 works so as to turn on the transistor 19 or 20 at an output side when an input voltage of the operational amplifier 17 becomes zero level.

This conventional DC motor drive circuit shows characteristics in which the current flowing in the two-phase stator winding does not increase rapidly just after one of the two transistors is turned on, but the current increases gradually because of a resistance and an inductance of the winding. The time constant due to the resistance R and the inductance L of the winding is represented by L/R. If this time constant is larger than the switching period T of the Hall element, the current flowing in the stator winding does not increase to a level that is sufficient for generating a drive force in the period T. Even if the current increases, it occurs in the latter half of the period T. In the case of a high speed fan motor, the period T becomes short, so the tendency that the current value increases only in the latter half of the period T may become conspicuous.

In order to explain a principle that is a precondition for understanding the present invention, it will be explained first how rotation of a typical brushless motor and switching of the stator winding current contribute a rotational drive force with reference to FIGS. 8A and 8B. The positions indicated by arrows (a)–(f) in FIG. 8A respectively denote times corresponding to positions (a)–(f) of the rotor in FIG. 7. It shows that the current that was flowing in one winding during the period from (c) to (d) is switched to flow in the other winding. Furthermore, FIG. 8A shows a waveform of current that flows in a winding of a fan that has a high rotation speed. In a fan that has a high rotation speed, a thick wire is used for making the winding so as to reduce a resistance R of the winding for increasing the current I that flows in the winding and for increasing a rotation torque. In this fan, since the resistance R of the winding is small, the time constant (L/R) of the winding becomes large, and the current waveform has a shape as shown by a continuous line in FIG. 8A in which the current increases rapidly at the end of the period T. Furthermore, the waveform shown by a dotted line in FIG. 8A is a waveform in the case where there is no delay of the current waveform due to the inductance of the winding. Therefore, when the power supply voltage is E, the peak value Ip2 of the current substantially equal to E/R. Since the time constant of the winding is L/R, the time constant becomes a large value in a fan motor using a winding with a small resistance. As a result, the delay of the current waveform becomes large like the current waveform as shown by the continuous line in FIG. 8A. Although the peak value Ip3 of the current is smaller than Ip2, it becomes a very large value compared with current value at the time (b) that is positioned at the middle of the period. Here, the period T corresponds to the time in which the motor rotates a ¼ turn. The rotor position that corresponds to the time (b) in FIG. 8A is the position in which the stator current is converted into the rotor rotation torque most efficiently as being explained later. In contrast, even if the stator current is increased in the position corresponding to the time (c), it is not converted into the rotation torque efficiently. Therefore, in the fan having the current waveform as shown in FIG. 8A, the current that is supplied to the stator can not be converted into the rotation torque efficiently.

Such stator current that is not converted into the rotation torque is consumed or wasted as heat by portions that are snubber circuits 50 and 51 as shown in FIG. 5. Accordingly, it is required to control the current supply to the stator winding so that the current becomes a peak at the time (b) when it is converted into the rotor rotation torque most efficiently. However, in the conventional control circuit, the stator current value increases in the latter half of the period T like the stator current as shown by the continuous line in FIG. 8A, and a large portion of the current is consumed as heat in the snubber circuit. This means that efficiency of converting an electric energy supplied to the motor into a rotation torque is small.

SUMMARY OF INVENTION

An object of the present invention is to convert the stator current into the rotor rotation torque at high efficiency by moving up the timing for supplying current to the stator winding in accordance with an operational condition of the motor. Thus, another object is to provide a high efficiency DC motor drive circuit that can suppress the current that does not contribute to the torque and is consumed as heat by the snubber circuit.

According to one aspect of the present invention, a DC motor drive circuit has a structure as shown in FIG. 1, including a position detecting portion C1 for producing two output signals having different phases that correspond to a rotational position of the rotor of the motor M1, a phase advancing portion C2 for receiving the two output signals from the position detecting portion C1 and for producing two phase-advanced output signals in which the phases of the output signals are advanced, and a current controlling portion C3 for receiving the two phase-advanced output signals from the phase advancing portion C2 and for supplying the winding with a drive signal in which the timing for supplying current is advanced.

In the above-mentioned DC motor drive circuit, the phase advancing portion may include a differential amplifier having two transistors and a circuit network made of a capacitor and a resistor in one case. In another case, the phase advancing portion may include a differential amplifier using an operational amplifier, a capacitor and a resistor.

Furthermore, a motor structure that is an object of the present invention is a single-phase motor or a two-phase motor having the effect as follows. According to the present invention, since the phase advancing circuit advances the phase of the output signal of a Hall element so that the stator current is switched in accordance with the phase-advanced signal, the stator current increases sufficiently at the portion close to the middle of the switching period T of the Hall element without increasing only at the end of the period. As a result, a torque and a rotation speed can be increased without increasing supplied current. In addition, power consumption that is consumed or wasted by a snubber circuit can be reduced. As a result, the drive efficiency of the motor can be improved.

DETAILED DESCRIPTION OF THE PREFERRED EMBODIMENTS

Hereinafter, embodiments of the present invention will be explained in detail with reference to the drawings.

Figure 1:
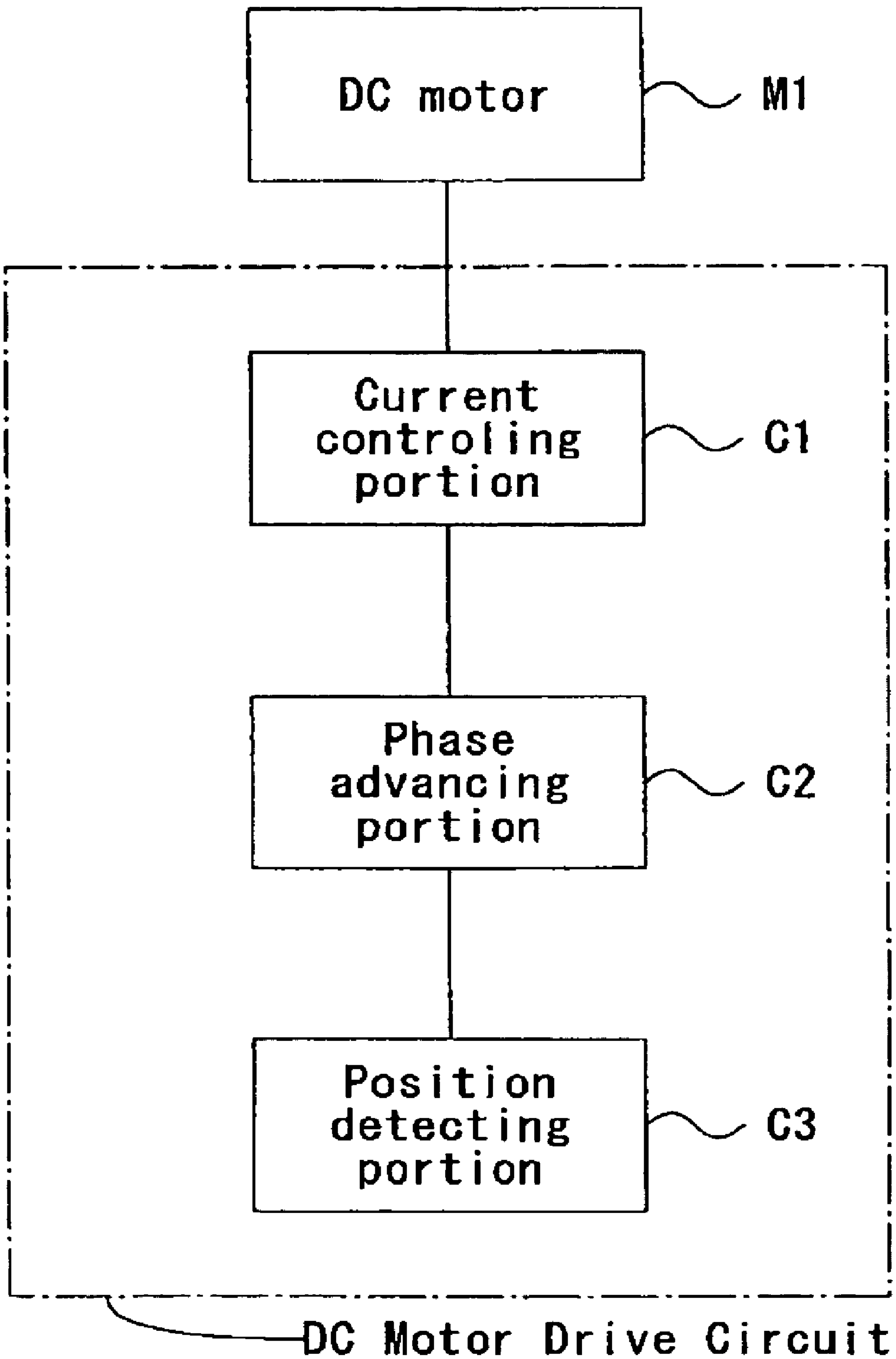
FIG. 1 shows a control block diagram according to the present invention.
Figure 2:
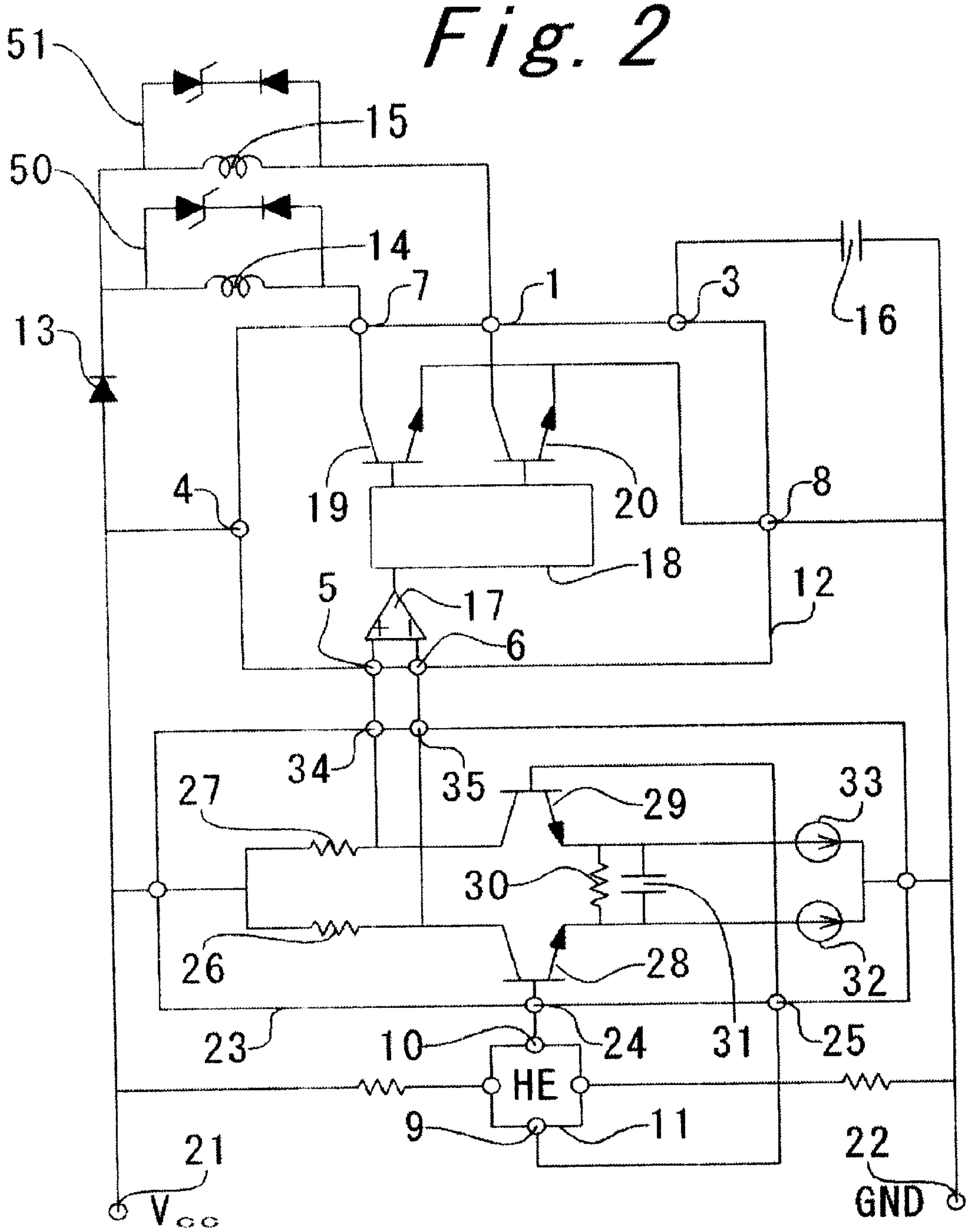
FIG. 2 is a circuit diagram according to a first embodiment of the present invention.
Figure 3:
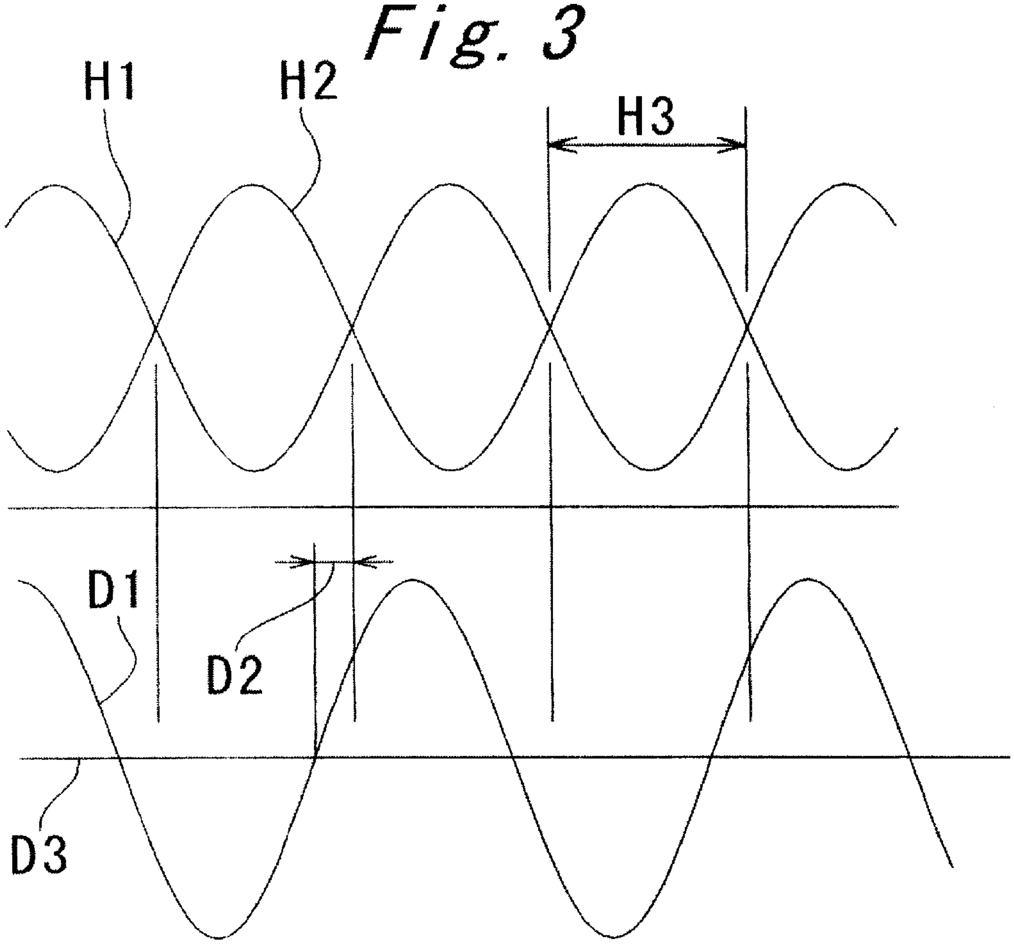
FIG. 3 is a diagram showing a waveform of a terminal voltage in the circuit shown in FIG. 2.

FIG. 2 shows a first embodiment of the present invention and is a circuit diagram showing a case where a drive circuit of a DC motor is applied to a two-phase half-wave (unipolar) fan motor. In addition, FIG. 3 shows a waveform of an output voltage at output terminals 9 and 10 of a Hall element 11 shown in FIG. 2 and a waveform of an output voltage of an operational amplifier 17 in a drive IC 12. In FIG. 3, the vertical axis represents voltage while the horizontal axis represents time.

Figure 5:
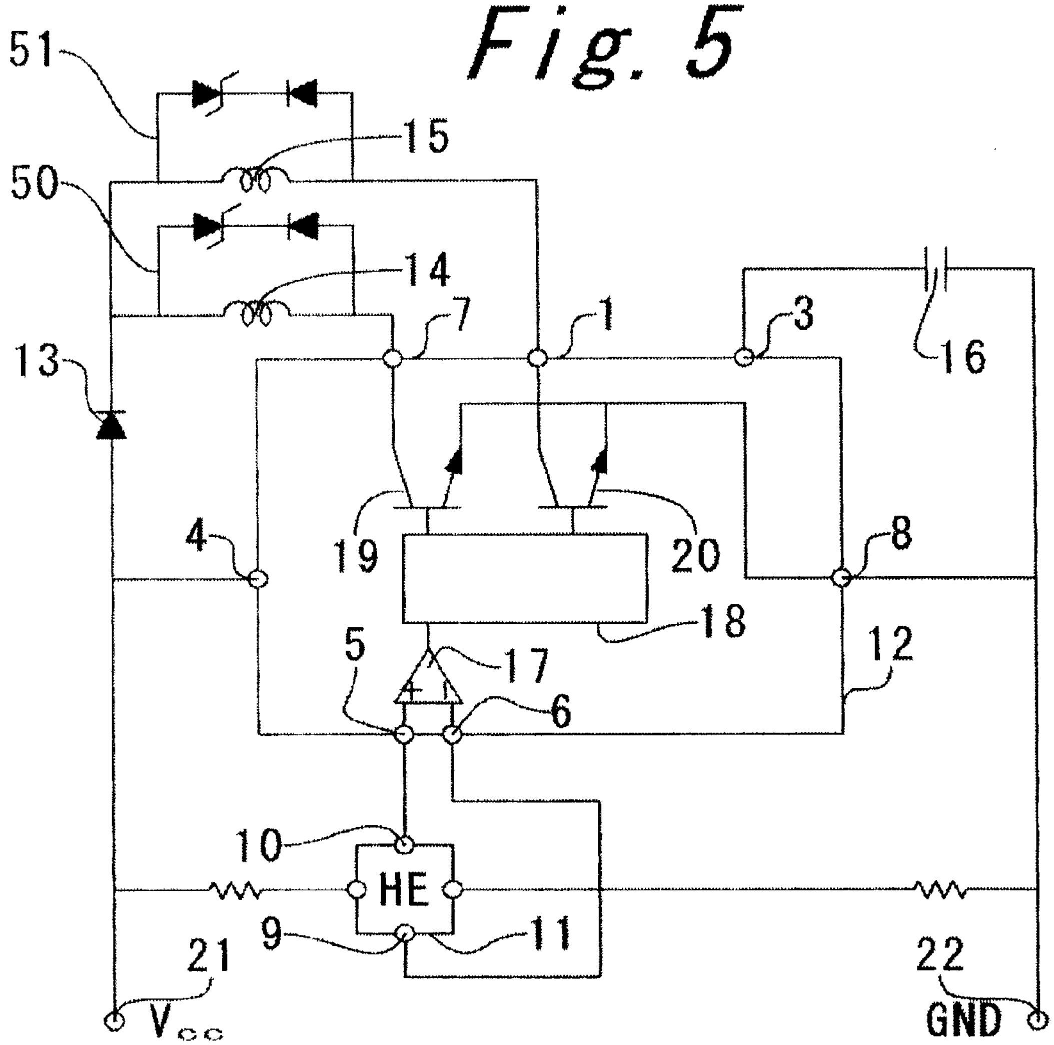
FIG. 5 is a diagram showing a conventional motor drive control circuit.
Figure 6:
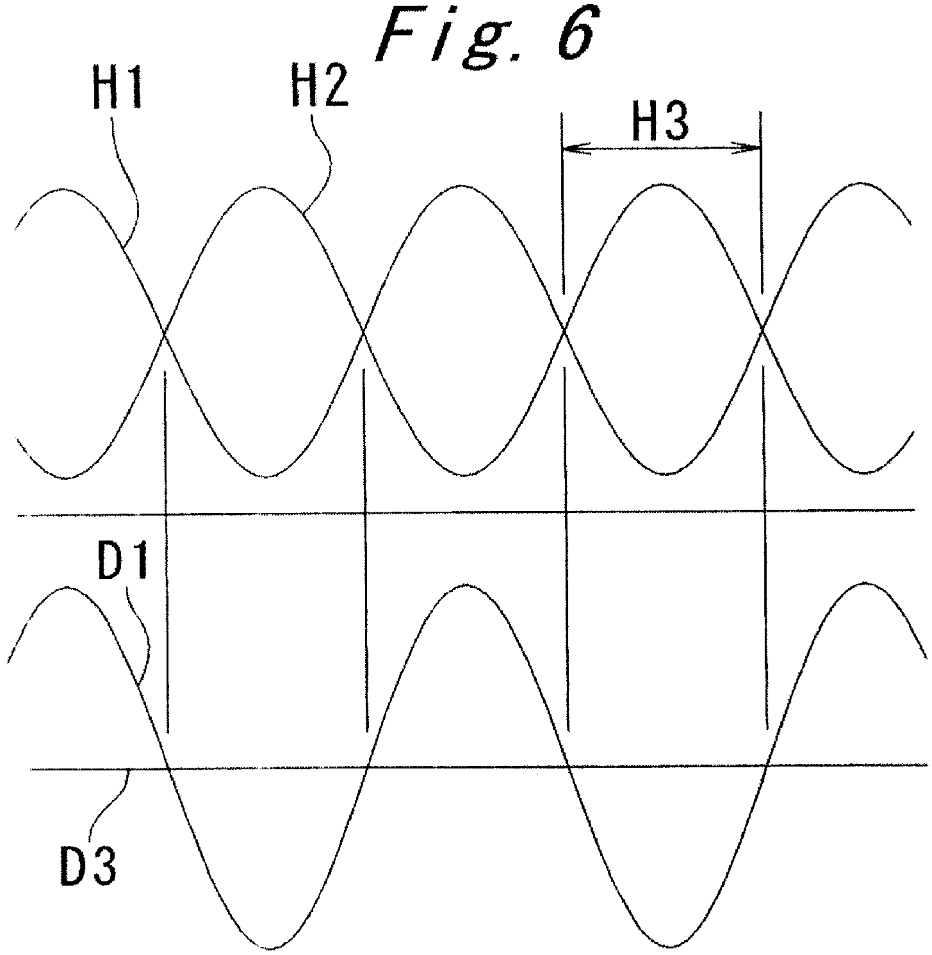
FIG. 6 is a diagram showing a waveform of a terminal voltage in the circuit shown in FIG. 5.

In this embodiment, a differential amplifying circuit 23 that works as a phase advancing circuit is added to the conventional drive circuit shown in FIG. 5. The differential amplifying circuit 23 is constructed with transistors 28, 29, constant current sources 32, 33, a condenser 31, and resistors 26, 27, 30, and the differential amplifying circuit 23 operates as a phase advancing circuit. One output terminal 9 of the Hall element 11 is connected to the base of the transistor 29 via a terminal 25 of the differential amplifying circuit 23, and the other output terminal 10 is connected to the base of the transistor 28 via a terminal 24 of the differential amplifying circuit 23. The Hall element 11 supplies a differential voltage that corresponds to a position of a magnetic pole of the rotor to bases of the transistors 28 and 29 that are input terminals of a differential amplifier 23. This voltage signal works so as to generate a voltage between the output terminals 34 and 35, where a phase of the voltage is advanced by the differential amplifier 23 by a time constant that corresponds to values of a resistor 30 and a capacitor 31 that are connected thereto.

This output voltage is given by the expression $K\times(1+j\omega CR)\times(Va-Vb)/R$, where Va and Vb respectively denote output voltages at the terminals 9 and 10 of the Hall element 11, R denotes a resistance value of the resistor 30, and C denotes a capacitance of the capacitor 31. In addition, K is a constant, j is an imaginary number, and $\omega$ is an angular frequency of the motor rotation. Namely, the output voltage of the differential amplifier 23 has a phase that is advanced from the input voltage thereof by $\tan\theta=\omega CR$ where $\theta$ is an angle of lead of the phase.

In the above calculation, the output signal of the Hall element is handled as a sine wave, though the real output signal of the Hall element is not always a complete sine wave. However, when observing the output signal in a short time of the period T corresponding to the motor rotation, these output signals can be considered as sine waves approximately. Therefore, it is possible to advance the phase of the Hall element by this circuit.

In the conventional motor control circuit explained with reference to FIG. 5, current supply to the stator winding is switched when the terminal voltages of the Hall element 11 become equal to each other. In another circuit as shown in FIG. 2, the phase of the terminal voltage signal of the Hall element 11 is advanced by the above-mentioned angle of lead $\theta$, so that switching operation that is faster than the conventional structure can be realized.

Figure 4:
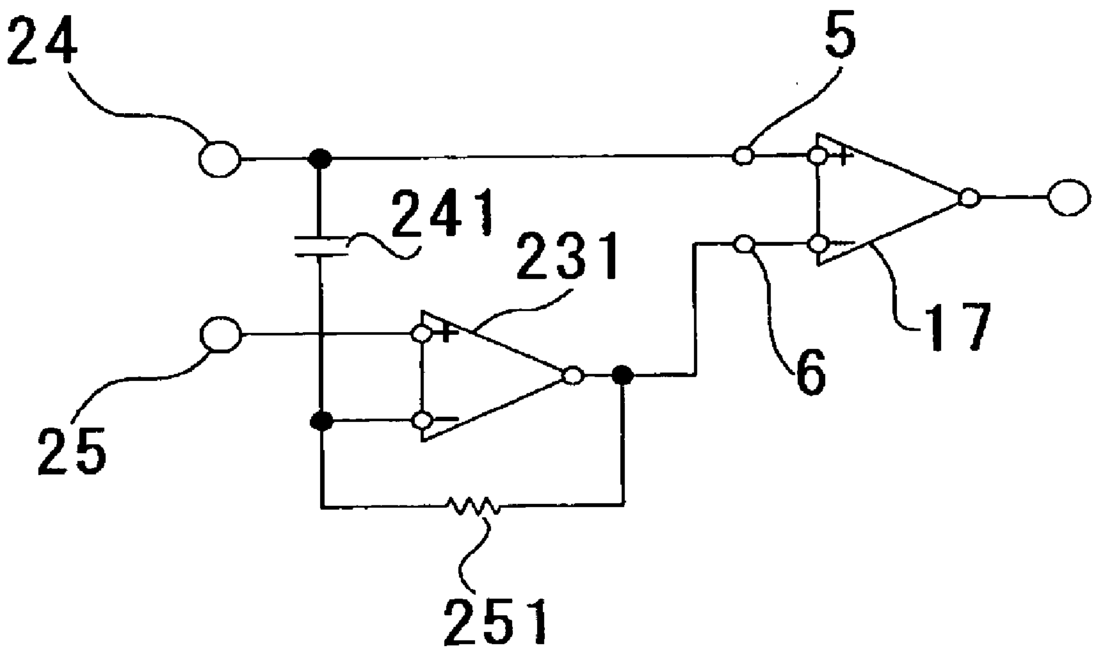
FIG. 4 is a diagram of another embodiment of a phase advancing circuit that constitutes the present invention.

Another embodiment of this phase advancing circuit is shown in FIG. 4. This phase advancing circuit includes a capacitor 241, a resister 241 and an operational amplifier 231 for amplifying the signals thereof. In the present invention, any circuit structure can be applied to the phase advancing circuit portion as long as it realizes the phase advancing circuit function.

Next, in order to promote understanding of the present invention, the fact that motor drive efficiency varies depending on a rotor position will be explained with reference to FIG. 7. Thus, it will be explained in detail how the phase advanced stator current contributes high efficiency operation of the motor.

Figure 7:
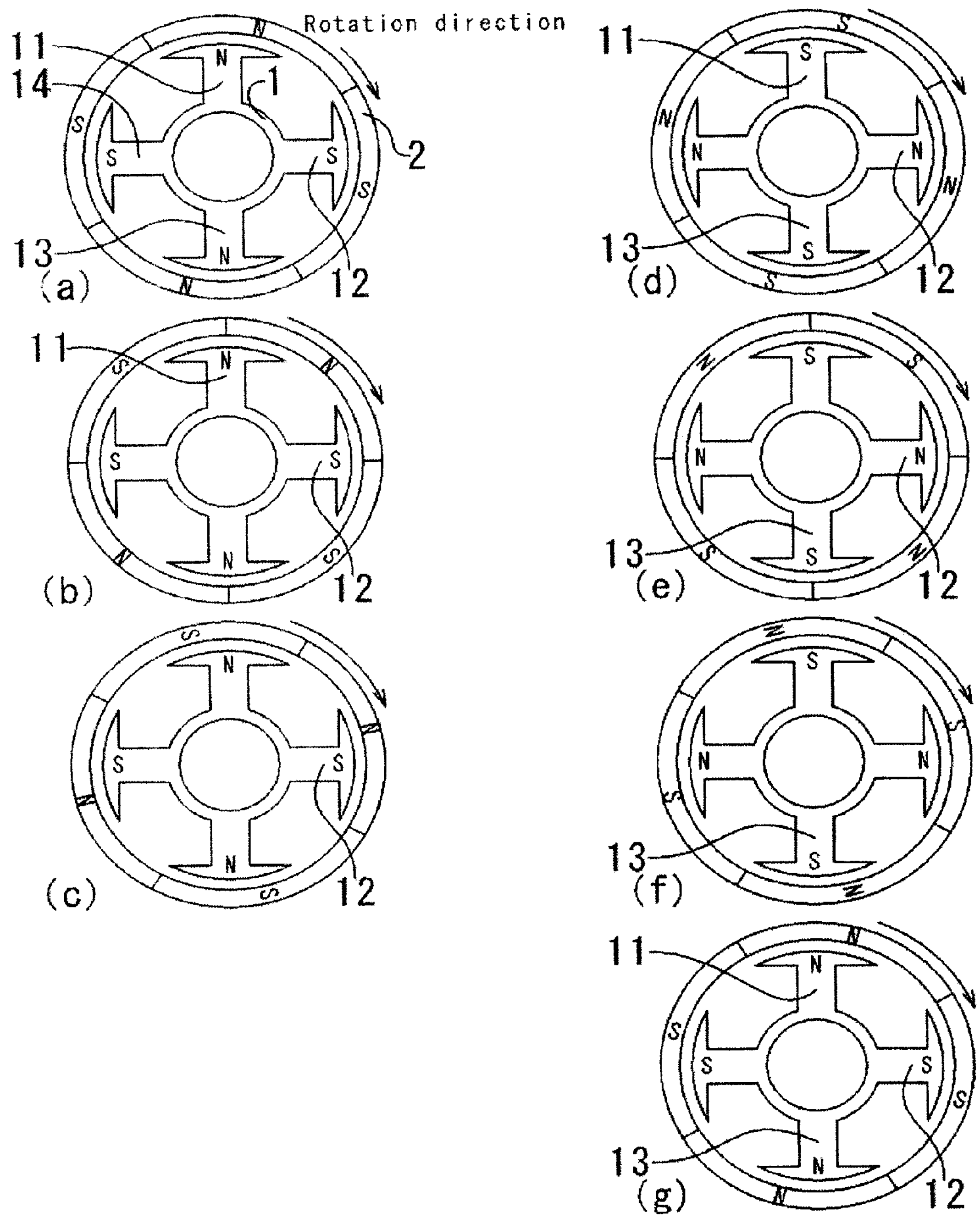
FIG. 7 is a diagram for explaining a relationship between a rotor position and a torque of a brushless motor.

FIG. 7 is a cross section of a brushless motor to which the present invention is applied, which is cut by the plane perpendicular to the rotation axis. In order to explain a torque generated between the stator 1 and the rotor 2, rotation of the rotor 2 and variation of magnetization by the winding of the stator 1 are shown at different rotation angles of the rotor as (a)–(g) in FIG. 7. This motor includes the stator 1 having hour teeth 11–14 and the rotor 2 that is a permanent magnet having four magnetic poles. The stator 1 is fixed and magnetized in the north pole and the south pole when the stator winding is supplied with current. The current supplied to the winding switches the north pole and the south pole alternately. The rotor 2 turns around the stator with respect to the rotation axis. The rotor 2 is divided into four magnetic poles, in which portions magnetized in the north pole and portions magnetized in the south pole are arranged alternately. The magnetization is formed substantially in a sine wave distribution, and the middle portion of one block has the highest magnetic property.

The position (a) in FIG. 7 shows that the north pole of the rotor is turned slightly from the position facing the tooth 11 of the stator in the rotation direction, when the tooth 11 of the stator is magnetized in the north pole while the tooth 12 is magnetized in the south pole. The north pole of the rotor is affected by a repulsive force from the north pole of the tooth 11 of the stator so that the rotor generates a rotation torque in the rotation direction.

The position (b) in FIG. 7 shows that the north pole of the rotor is positioned at the middle between the tooth 11 and the tooth 12 of the stator, when the north pole of the rotor is affected by a repulsive force from the tooth 11 and is affected by an attractive force from the tooth 12. This position can generate a large rotation torque most efficiently.

The position (c) in FIG. 7 shows that the north pole of the rotor is positioned slightly before the position facing the tooth 12 of the stator in the rotation direction, when the north pole of the rotor is affected by an attractive force from the tooth 12 so that the rotor generates a rotation torque in the rotation direction.

The position (d) in FIG. 7 shows that the north pole of the rotor is turned slightly from the position facing the tooth 12 of the stator in the rotation direction, when the stator is magnetized by the current flowing in the winding in a different manner from any of the cases shown in (a)–(c) of FIG. 7. The tooth 11 of the stator is magnetized in the south pole, the tooth 12 is magnetized in the north pole, and the tooth 13 is magnetized in the south pole. The north pole of the rotor is affected by a repulsive force from the tooth 12 so as to generate a rotation torque in the rotation direction.

The position (e) in FIG. 7 shows that the north pole of the rotor is positioned at the middle between the tooth 12 and the tooth 13 of the stator, when the rotor is affected by a repulsive force from the tooth 12 and is affected by an attractive force from the tooth 13. Similarly to the case shown in (b), this position can generate a large rotation torque most efficiently.

The position (f) in FIG. 7 shows that the north pole of the rotor is positioned slightly before the position facing the tooth 13 of the stator in the rotation direction, when the north pole of the rotor is affected by an attractive force from the tooth 13. Accordingly, the rotor generates a rotation torque in the rotation direction.

The position (g) in FIG. 7 shows that the north pole of the rotor is turned slightly from the position facing the tooth 13 of the stator in the rotation direction.

After that, the stator is magnetized again by the current flowing in the winding in the same manner as the cases shown in (a)–(c) of FIG. 7. In addition, the tooth 11 of the stator is magnetized in the north pole, the tooth 12 is magnetized in the south pole, and the tooth 13 is magnetized in the north pole. Therefore, the north pole of the rotor is affected by a repulsive force from the tooth 13 so as to generate a rotation torque in the rotation direction. Furthermore, since the stator and the rotor are structured to be symmetric to each other with respect to the rotation axis, the positions (a) and (g) in FIG. 7 have the same state. It is understood easily from FIG. 7 that even if the teeth of the stator are magnetized in the same magnetic force by the current flowing in the winding, the rotor is affected by different rotation torques in accordance with the position of the rotor. Namely, the position as shown in (b) of FIG. 7, in which the center of the magnetization of the rotor is positioned in the middle between the teeth of the stator, can generated the largest rotation torque. On the contrary, the position as shown in (a) or (c) of FIG. 7, in which the center of the magnetization of the rotor is positioned at a vicinity of a teeth of the stator, cannot generate a large rotation torque even if the current supplied to the winding is increased so as to enhance the magnetization of the stator.

Therefore, it is required to increase the current supplied to the winding so as to enhance the magnetization of a tooth of the stator when the center of the magnetization of the rotor is positioned as shown in (b) of FIG. 7, i.e., in the middle between teeth of the stator. In other words, the drive torque can be generated more efficiently by supplying the stator winding with the current that is not so increased when the center of the magnetization of the rotor is positioned as shown in (a) or (c) of FIG. 7, i.e., at a vicinity of a teeth of the stator.

Figure 8:
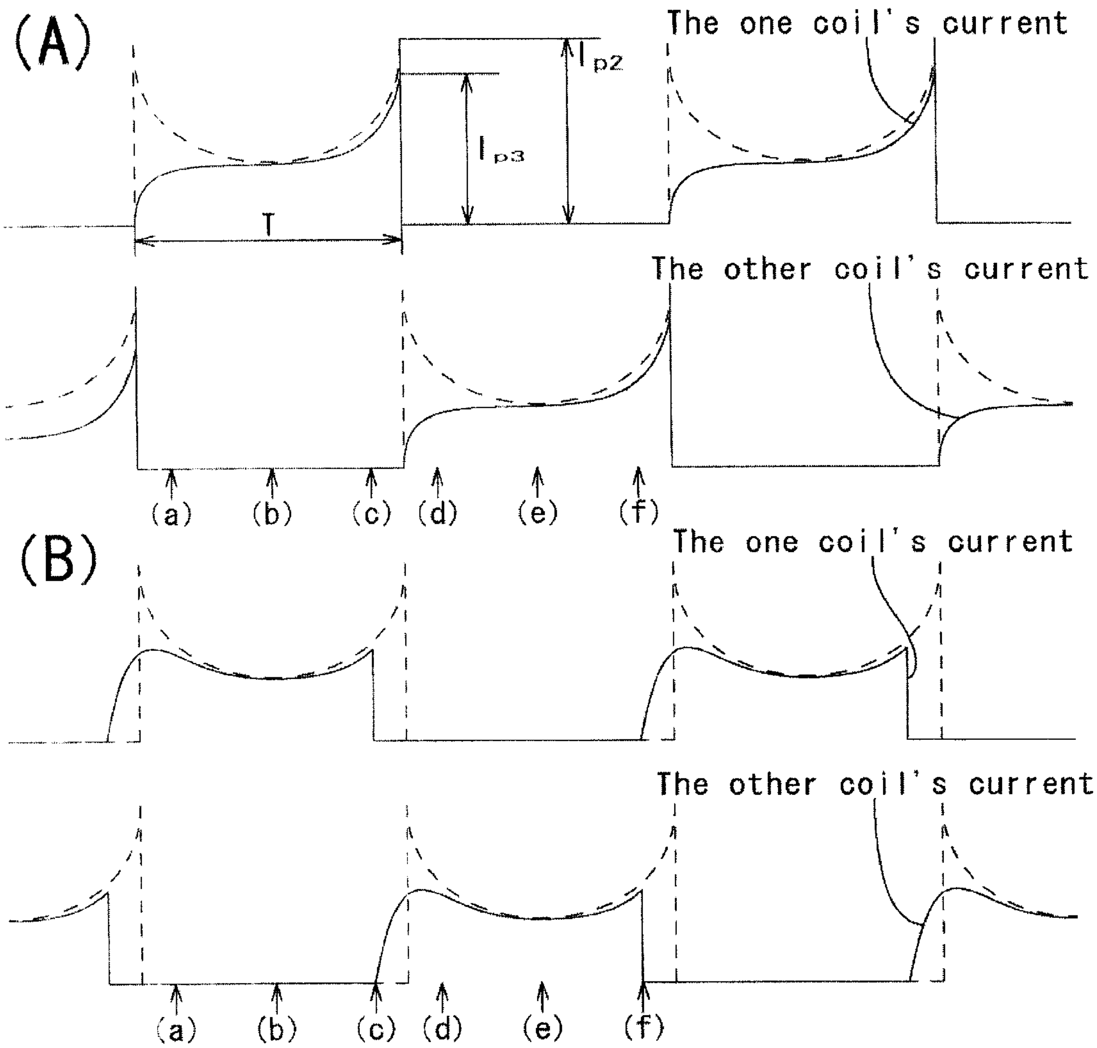
FIGS. 8A and 8B show stator current waveforms as a comparison between the present invention and the conventional technique.

Next, the variation of the current flowing in the winding along the rotation of the rotor and the shape of its waveform will be explained with reference to FIGS. 8A and 8B. In FIGS. 8A and 8B, the vertical axis represents voltage while the horizontal axis represents time.

As mentioned in the explanation of the conventional technique, FIG. 8A shows an example of the conventional motor. Compared with the current at the time (b) that is the middle of the period, the current at the time (c) that is the end of the period T is very large. As a result, the current supplied to the stator cannot be converted into the rotation force of the motor efficiently, resulting in a low efficiency of the motor.

On the other hand, FIG. 8B shows a waveform of the stator winding current of the motor to which the present invention is applied. The waveform shown in the continuous line is a waveform of the current that flows in the winding. The waveform shown in the dotted line is a waveform of the stator current in the case where the stator winding current is switched in accordance with the output voltage signal of the Hall element and the current waveform has no delay due to the inductance of the winding. The positions shown by arrows (a)–(f) in FIG. 8B indicate times corresponding to the positions (a)–(f) of the rotor in FIG. 7. Since the phase of the output voltage signal of the Hall element is advanced, current starts to flow in one of the winding earlier than the waveform shown by the dotted line. In addition, the current is switched from one winding to another winding earlier than the waveform shown by the dotted line. In other words, the winding current shown in FIG. 8B starts earlier and ends earlier than the case where the phase is not advanced. For example, the current is switched from one winding to the other winding at a position of the rotor between the time (c) and the time (d) in FIG. 8A, while it is switched at the time (c) in FIG. 8B. As shown by the waveform in FIG. 8B, since the timing when the current starts to flow in the winding is early, the current has increased up to a sufficiently large value at the time (b) even if there is a delay of the current waveform due to the inductance and the resistance of the stator winding. Therefore, the current around the time (b) at the middle of the period T, in which the winding current is converted into the motor drive force most efficiently, is larger than the case where the phase is not advanced as shown in FIG. 8A. Thus, the efficiency of the motor is improved. In addition, since the current supplied to the winding is switched at early timing, the current is suppressed at the end of the period T. Thus, the current that is wasted as heat by the snubber circuits 50 and 51 is reduced so that the efficiency of the motor can be further improved.

There is another method in which the signal of the Hall element is advanced mechanically by setting the Hall element so as to shift the position thereof oppositely in the rotation direction instead of advancing the output voltage signal of the Hall element electrically. However, if the position of the Hall element is advanced mechanically, the Hall element may be switched at early timing also at the start when the rotation speed is low, and the start may be impossible. An advantage of advancing the phase by the electrical method is that the phase is not advanced when the rotation speed is low but is advanced when the rotation speed becomes high.

Furthermore, the detail of improving the efficiency of the motor by advancing the timing of supplying current to the winding so as to reduce the current that is wasted by the snubber circuit will be explained as below.

The winding of the stator will be explained with reference to FIGS. 10A and 10B. There are two sets of windings including a winding AB from A to B that is turned around the tooth 11 and then around the tooth 13 of the stator, and a winding CD from C to D stator that is turned around a tooth 14 and then around the tooth 12 of the stator. In one case as shown in FIG. 10A, where the current flows in the winding AB from A to B, the teeth 11 and 13 of the stator are magnetized in the north pole toward the outer rim of the stator. At the same time, the south pole is induced to the teeth 12 and 14 of the stator, which are magnetized in the south pole. This state corresponds to the states of the stator shown in (a) through (c) of FIG. 7. Furthermore, another case shown in FIG. 10B is the state of the magnetization of the stator when the current flows in the winding CD from C to D. The teeth 12 and 14 of the stator are magnetized in the north pole toward the outer rim of the stator. At the same time, the south pole is induced to the teeth 11 and 13 of the stator, which are magnetized in the south pole. This state corresponds to the states of the stator shown in (d) through (f) of FIG. 7. The current flowing in the winding will be explained with reference to FIGS. 9A and 9B.

Figure 9:
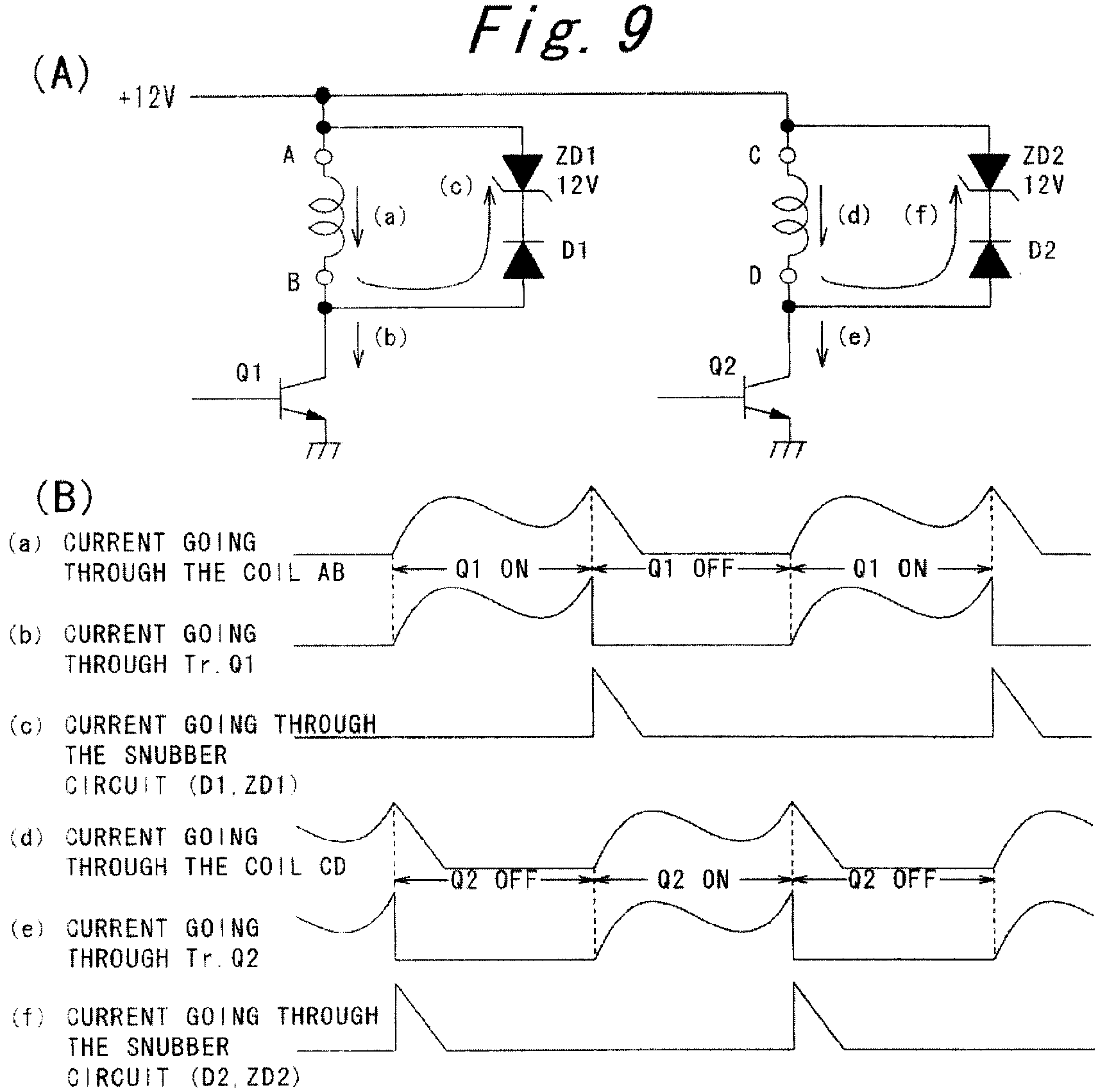
FIGS. 9A and 9B show a structure of a snubber circuit and a current waveform thereof.
Figure 10:
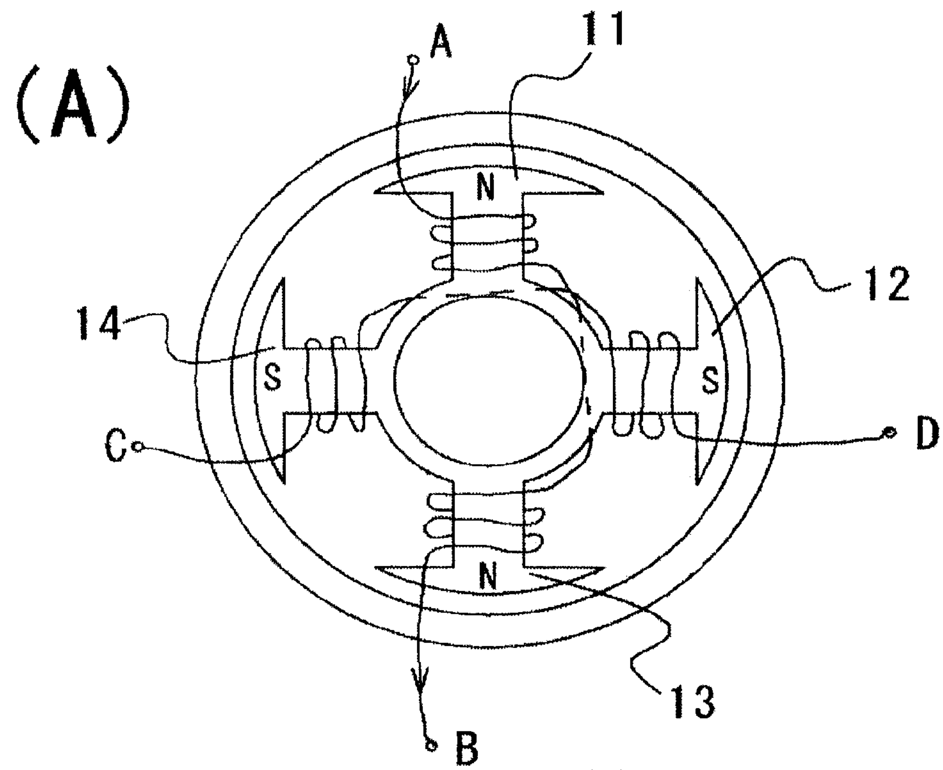
FIGS. 10A and 10B show a rotor and a stator of a two-phase motor and its winding form.
Figure 10:
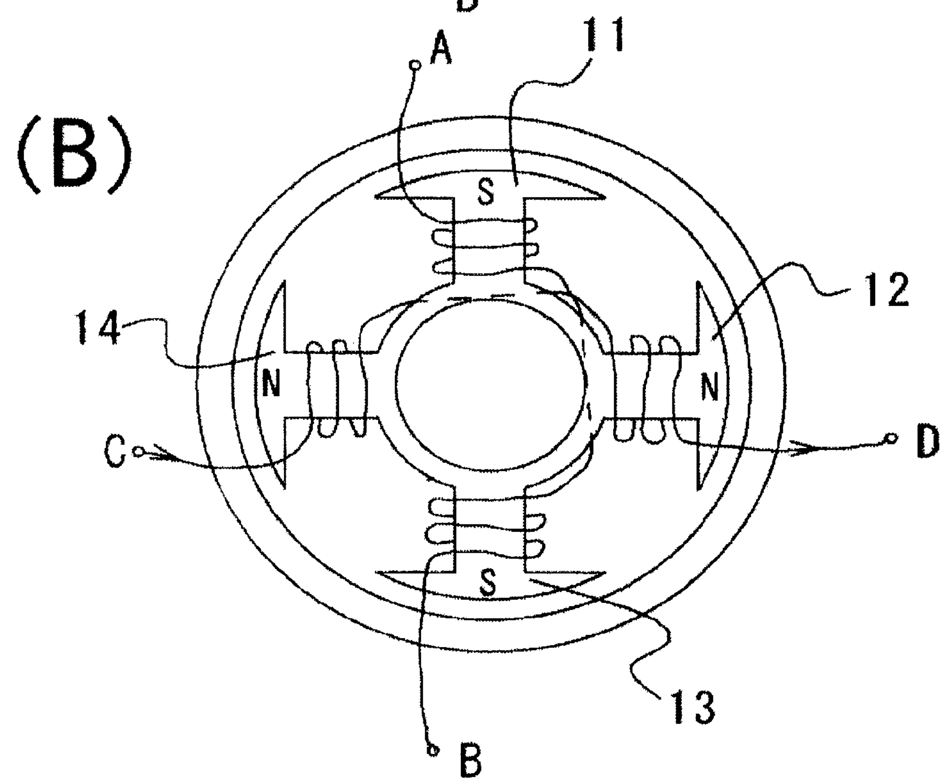

FIGS. 9A and 9B show a structure of a snubber circuit and a current waveform thereof.

FIGS. 9A and 9B show a circuit diagram in which the winding AB, the winding CD, transistors Q1 and Q2 for supplying electric current to the winding and the snubber circuit 50 and 51 are connect, and waveforms of current flowing in each of the elements. Here, the vertical axis represents current wile the horizontal axis represents time.

When the transistor Q1 is turned on, the current of the waveform as shown in (a) of FIG. 9B flows in the winding AB. When transistor Q1 is turned off, the current flowing in the transistor Q1 becomes zero soon as shown in (b) of FIG. 9B. When the value of the current flowing in the winding AB varies rapidly, the winding AB generates an induced voltage so that the voltage at the B side of the winding AB rises. As a result, the voltage at the anode side of the diode D1 rises so that current flows through the diode D1 and the Zener diode ZD1 from B to A. This current has a waveform as shown in (c) of FIG. 9B. The circuit made of the diode D1 and the Zener diode ZD1 is for suppressing the induced voltage generated by the rapid change of the current flowing in the winding and is called a snubber circuit. In the same way, the current flowing in the winding CD has a waveform as shown in (d) of FIG. 9B, the current flowing in the transistor Q2 has a waveform as shown in (e) of FIG. 9B, and the current flowing in the snubber circuit including the diode D2 and the Zener diode ZD2 has a waveform as shown in (f) of FIG. 9B. The current flowing in the snubber circuit including the diode D1 and the Zener diode ZD1 consumes power in the diode D1 and the Zener diode ZD1. This power is not a power consumed in the winding, so it does not contribute to the rotation torque of the motor. Accordingly, if this power is large, it means that the power supplied to the motor is used for other than the rotation torque, resulting in lowering efficiency of the fan. Similarly, if the power that consumed in the snubber circuit including the diode D2 and the Zener diode ZD2 is large, efficiency of the fan is lowered. As explained above, when the output waveform of the Hall element is advanced in the time scale, the current at the end of the period can be reduced compared with the case where the output waveform of the Hall element is not advanced in the time scale. Therefore, a peak value of the current flowing in the snubber circuit is reduced as shown in (c) and (f) of FIG. 9B. As a result, the power consumed in the snubber circuit can be reduced. Thus, efficiency of the fan can be improved.

Figure 11:
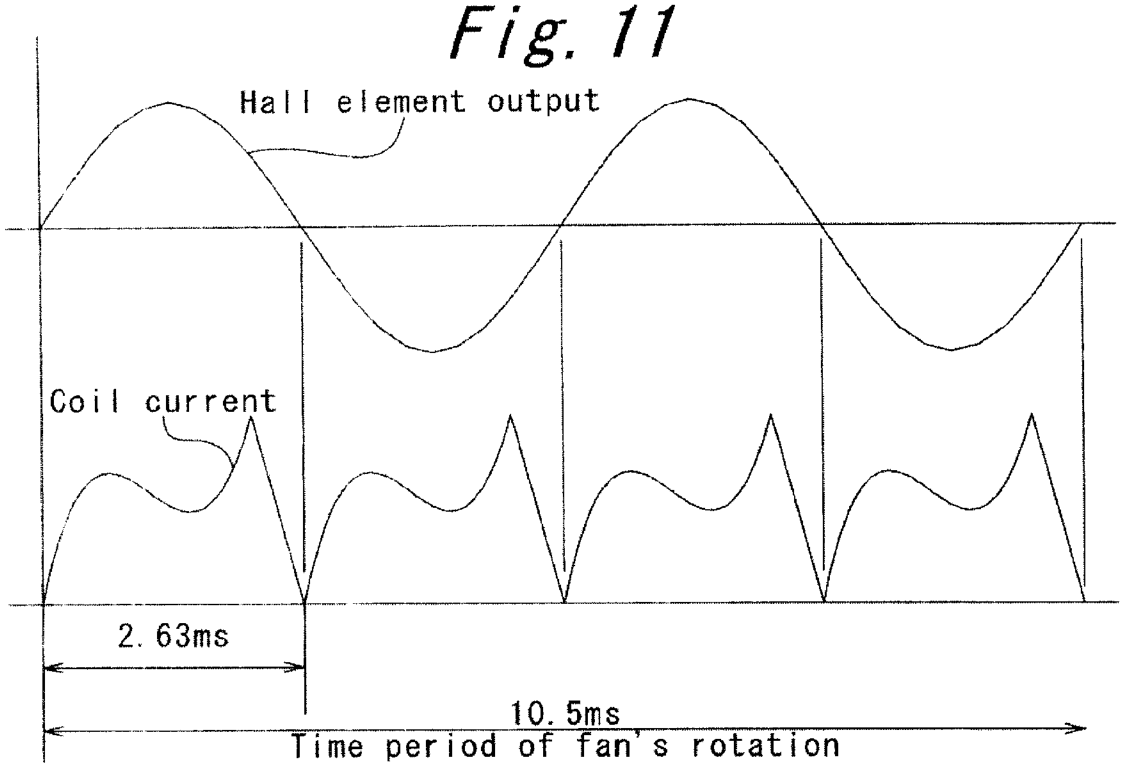
FIG. 11 shows an example waveform of an output of a Hall element and a winding current.

Furthermore, the angle of lead, the delay in supplying current to the winding, and the period of the winding current in this example are confirmed numerically as follows. FIG. 11 shows the period and the waveform concretely with the Hall device voltage in the vertical axis and the winding current in the horizontal axis. The phase advancing circuit having the structure shown in FIG. 4 was used.

The inductance L and the resistance R of the stator winding of the brushless motor to be controlled were L=1.66 mH and R=1.32 ohms, respectively. Accordingly, the time constant of this motor is L/R=1.25 milliseconds.

If the conventional switching control circuit is used for this motor, the stator winding current becomes as shown by the continuous line in FIG. 8A. In contrast, in order to obtain the advanced angle 17 degrees of the circuit as shown in FIG. 4 by applying the present invention under the condition that the capacitance $C_{241}$=0.047 μF, the resistance value $R_{251}$ is decided as below.

$$R_{251}=(\tan(17\text{ degrees}))/(\omega\times C_{241})$$

Here, since tan(17 degrees)=0.314, and ω=2π(5700/60)×2=1193.80, the above equation becomes as below.

$$R_{251}=0.314/(1193.80\times0.047\times10^{-6})=5600\text{ ohms}$$

If the output signal of the Hall element varies very slowly like the case where one motor is started or the rotation speed of the motor is low, the capacitor 31 of the differential amplifying circuit 23 does not respond to a low frequency in FIG. 2. Therefore, the differential amplifying circuit 23 works as an amplifier having the gain one and does not work as the phase advancing circuit. Namely, the voltage output of the operational amplifier 17 in FIG. 2 is expressed in K×(1+jωCR)×(Va−Vb)/R, and low speed corresponds that ω is close to zero. Therefore, jωCR becomes close to zero; the imaginary part of the (1+jωCR) is approximately zero. Therefore, the value of (1+jωCR) becomes one, which means that the gain is one and the advanced angle is zero degree.

Furthermore, since the time when the current start to flow in the winding becomes earlier, the current at the start timing generates a rotation torque of the motor in the opposite direction. However, since the current value at the start timing is small, improvement of the rotation torque due to the current that flows at the middle of the period for switching the Hall element contributes substantially, so that the rotation speed does not decrease.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A DC motor drive circuit for driving a single-phase brushless motor including a stator with a single-phase winding and a rotor having a rotor magnet arranged to be opposed to the stator, the DC motor drive circuit comprising:

a position detecting portion for producing two output signals having different phases that correspond to a rotational position of the rotor;

a current controlling portion for controlling current supply to the winding in accordance with the output signal of the position detecting portion; and a phase advancing portion for receiving two output signals from the position detecting portion and for producing two phase-advanced output signals in which the phases of the output signals are advanced, the phase advancing portion including a differential amplifier having two transistors, and a circuit network made of a capacitor and a resistor that is connected between emitters of the two transistors;

wherein the two output signals from the position detecting portion are respectively supplied to bases of the two transistors, and the phase-advanced output signals are obtained from collectors of the two transistors and are supplied to the current controlling portion so that the timing for supplying current to the winding is advanced.

2. The DC motor drive circuit according to claim 1, wherein the current controlling portion includes a drive circuit having a pair of differential input terminals for controlling current supply to the winding in accordance with the output signal of the position detecting portion.

3. A DC motor drive circuit for driving a single-phase brushless motor including a stator with a single-phase winding and a rotor having a rotor magnet arranged to be opposed to the stator, the DC motor drive circuit comprising:

a position detecting portion for producing two output signals having different phases that correspond to a rotational position of the rotor;

a current controlling portion for controlling current supply to the winding in accordance with the output signal of the position detecting portion; and a phase advancing portion for receiving two output signals from the position detecting portion and for producing two phase-advanced output signals in which the phases of the output signals are advanced, the phase advancing portion including a differential amplifier made of an operational amplifier, a capacitor and a resistor, one of the outputs of the position detecting portion is supplied to the noninverting input terminal of the differential amplifier, and a signal generated by dividing a voltage between the other output of the position detecting portion and the output of the differential amplifier by the capacitor and the resistor is supplied to the inverting input terminal of the differential amplifier;

wherein the two phase-advanced output signals of the phase advancing portion are supplied to the current controlling portion so that the timing for supplying current to the winding is advanced.

4. The DC motor drive circuit according to claim 3, wherein the current controlling portion includes a drive circuit having a pair of differential input terminals for controlling current supply to the winding in accordance with the output signal of the position detecting portion.

5. A DC motor drive circuit for driving a two-phase brushless motor including a stator with a two-phase winding and a rotor having a rotor magnet arranged to be opposed to the stator, the DC motor drive circuit comprising:

a position detecting portion for producing two output signals having different phases that correspond to a rotational position of the rotor;

a current controlling portion for controlling current supply to the winding in accordance with the output signal of the position detecting portion; and a phase advancing portion for receiving two output signals from the position detecting portion and for producing two phase-advanced output signals in which the phases of the output signals are advanced, the phase advancing portion including a differential amplifier having two transistors, and a circuit network made of a capacitor and a resistor that is connected between emitters of the two transistors;

wherein the two output signals from the position detecting portion are respectively supplied to bases of the two transistors, and the phase-advanced output signals are obtained from collectors of the two transistor and are supplied to the current controlling portion so that the timing for supplying current to the winding is advanced.

6. The DC motor drive circuit according to claim 5, wherein the current controlling portion includes a drive circuit having a pair of differential input terminals for controlling current supply to the winding in accordance with the output signal of the position detecting portion.

7. A DC motor drive circuit for driving a two-phase brushless motor including a stator with a two-phase winding and a rotor having a rotor magnet arranged to be opposed to the stator, the DC motor drive circuit comprising:

a position detecting portion for producing two output signals having different phases that correspond to a rotational position of the rotor, a current controlling portion for controlling current supply to the winding in accordance with the output signal of the position detecting portion; and a phase advancing portion for receiving two output signals from the position detecting portion and for producing two phase-advanced output signals in which the phases of the output signals are advanced, the phase advancing portion including a differential amplifier made of an operational amplifier, a capacitor and a resistor, one of the outputs of the position detecting portion is supplied to the noninverting input terminal of the differential amplifier, and a signal generated by dividing a voltage between the other output of the position detecting portion and the output of the differential amplifier by the capacitor and the resistor is supplied to the inverting input terminal of the differential amplifier, wherein the two phase-advanced output signals of the phase advancing portion are supplied to the current controlling portion so that the timing for supplying current to the winding is advanced.

8. The DC motor drive circuit according to claim 7, wherein the current controlling portion includes a drive circuit having a pair of differential input terminals for controlling cm-rent supply to the winding in accordance with the output signal of the position detecting portion.

* * * * *